May 13, 1952 — A. B. SKROMME — 2,596,872

BALE CASE EXTENSION FOR AGRICULTURAL BALERS

Filed April 13, 1951 — 2 SHEETS—SHEET 1

INVENTOR.
A. B. Skromme
BY
Attorneys

May 13, 1952    A. B. SKROMME    2,596,872
BALE CASE EXTENSION FOR AGRICULTURAL BALERS
Filed April 13, 1951    2 SHEETS—SHEET 2
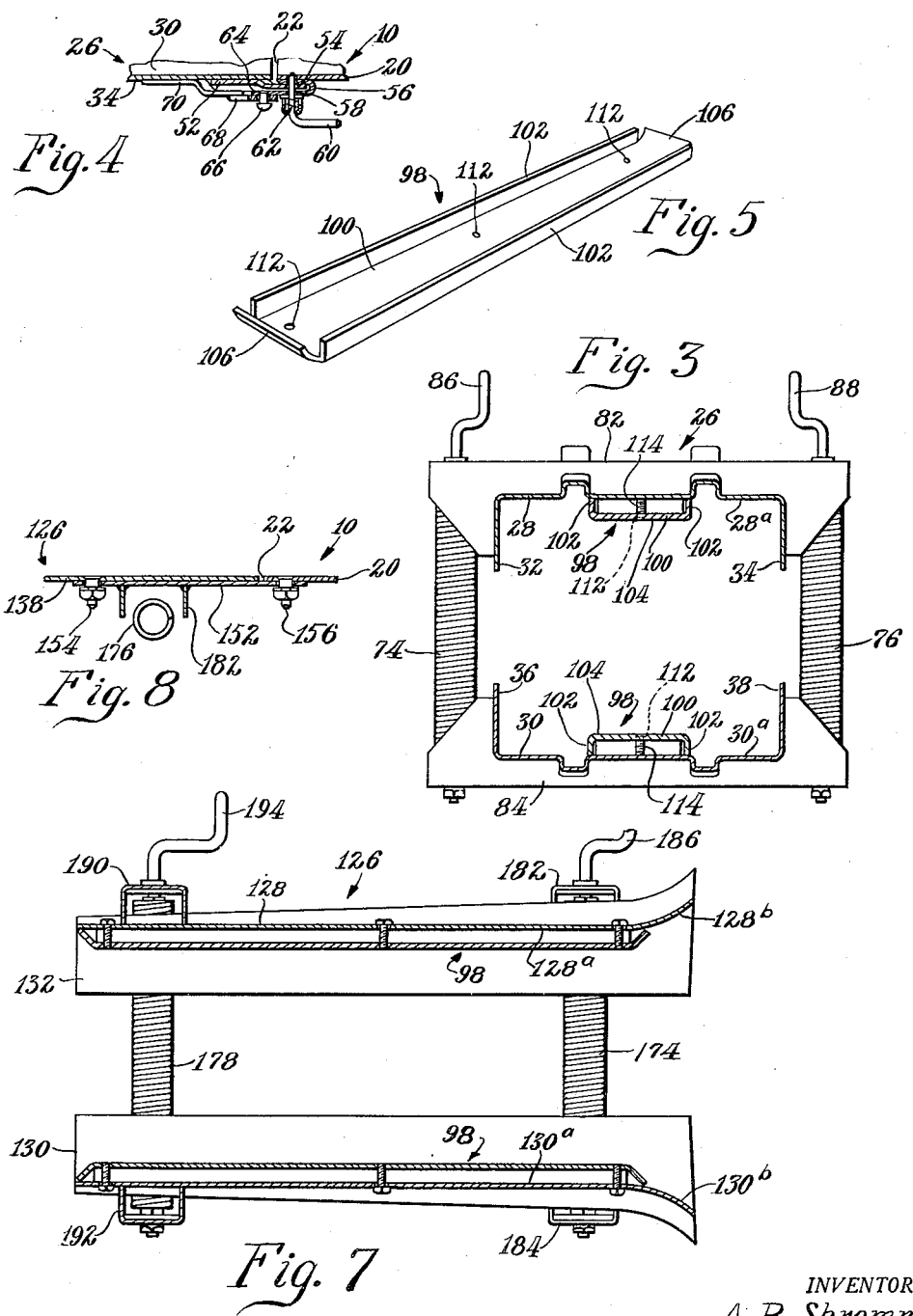

Patented May 13, 1952

2,596,872

UNITED STATES PATENT OFFICE 2,596,872

BALE CASE EXTENSION FOR AGRICULTURAL BALERS

Arnold B. Skromme, Ottumwa, Iowa, assignor to Deere Manufacturing Co., Dubuque, Iowa, a corporation of Iowa Application April 13, 1951, Serial No. 220,917

10 Claims. (Cl. 100—23)

This invention relates to a hay baler of the type used on farms for the baling of hay, straw, and similar material. More particularly, the invention relates to improved means for controlling the weight or density of the bales formed by the baler.

In a typical baler construction, the baler has a bale case or chamber of generally rectangular cross section defined by upper and lower and opposite side walls. The density and weight of the bales are affected by the frictional resistance between the inner surfaces of the chamber walls and the material being baled. For example, in the case of light and dry material, the frictional resistance will be relatively low and if a constant volume is maintained, the bale formed of such material will be considerably lighter than a bale of material having an identical volume but a higher moisture content. Accordingly, it has heretofore been the practice to provide tensioning means for controlling the spacing between various of the chamber walls. Normally, this means comprises control means incorporated into what is known as a bale case extension. This extension is in the form of a box-like structure attached to the end of a bale chamber as a continuation thereof and having a cross sectional shape substantially like that of the bale chamber.

In a typical construction, control is accommodated by yielding means varying the spacing between the upper and lower walls of the bale case extension. For example, in its simplest form, the tensioning or control means may take the form of springs urging these two walls together, the springs being yieldable to permit separation of the walls as the bale material is forced between the walls. When it is desired to increase the weight and density of the bale, tension on the springs is increased. Conversely, tension on the springs may be decreased in conditions in which the material has a relatively higher moisture content.

Although many different forms of bale tensioning means of the general character referred to have been developed in the past, none of them is completely satisfactory. In this respect, it must be borne in mind that a device that works to complete satisfaction with a certain kind of crop and under certain moisture-content conditions may be particularly undesirable in different conditions. The problem is largely one of compromise, considering also the factors of economy, efficiency, and ease in use and maintenance.

According to the present invention, the bale case extensions based on two modified forms of the invention satisfactorily meet all these requirements and the performance thereof is highly acceptable. The primary objectives achieved by the invention result fundamentally from the provision of a bale case extension having relatively movable upper and lower controlling walls supported in such manner that movement of the upper wall at one end is confined to substantially a straight-line path toward and away from the proximate end of the other wall. At the same time, the outer or free ends of the walls or members may have relative movement through an arc generally about a transverse axis through the means that supports the bale case extension walls on the bale case. A further object of the invention resides in the use of a plurality of springs at both the inner and outer ends, as distinguished from the use of springs at only the outer end in prior constructions. The innermost springs enable the extension to exert pressure closer to the plunger head, thus contributing materially to the forming of more nearly uniform bales. Springs at both inner and outer ends of the extension make possible the application of pressure throughout, rather than at only one end. Further, less pressure is required at the outer end of the extension. Still another object of the invention is to constrain the relative movement of the walls in such manner that the movable wall (if only one is movable) is constrained against longitudinal movement in the direction of bale discharge.

The invention provides also an improvement in the formation of bales by means of a removable skid positionable lengthwise of one or more of the bale case extension walls to compress central portions of the bale.

The foregoing and other important objects and desirable features of the invention will become apparent from the following disclosure of preferred embodiments of the invention as illustrated in the accompanying sheets of drawings in which Figure 1 is a longitudinal section through the bale chamber or case and bale case extension as applied to a typical baler construction;

Figure 3 is a transverse sectional view taken on the line 3—3 of Figure 2;

Figure 4 is a fragmentary sectional view taken on the line 4—4 of Figure 2;

Figure 5 is a perspective view of one of the compression or removable skid members;

Figure 7 is a longitudinal sectional view through the structure shown in Figure 6; and Figure 8 is a fragmentary sectional view taken on the line 8—8 of Figure 6.

Figures 1, 2, 6:
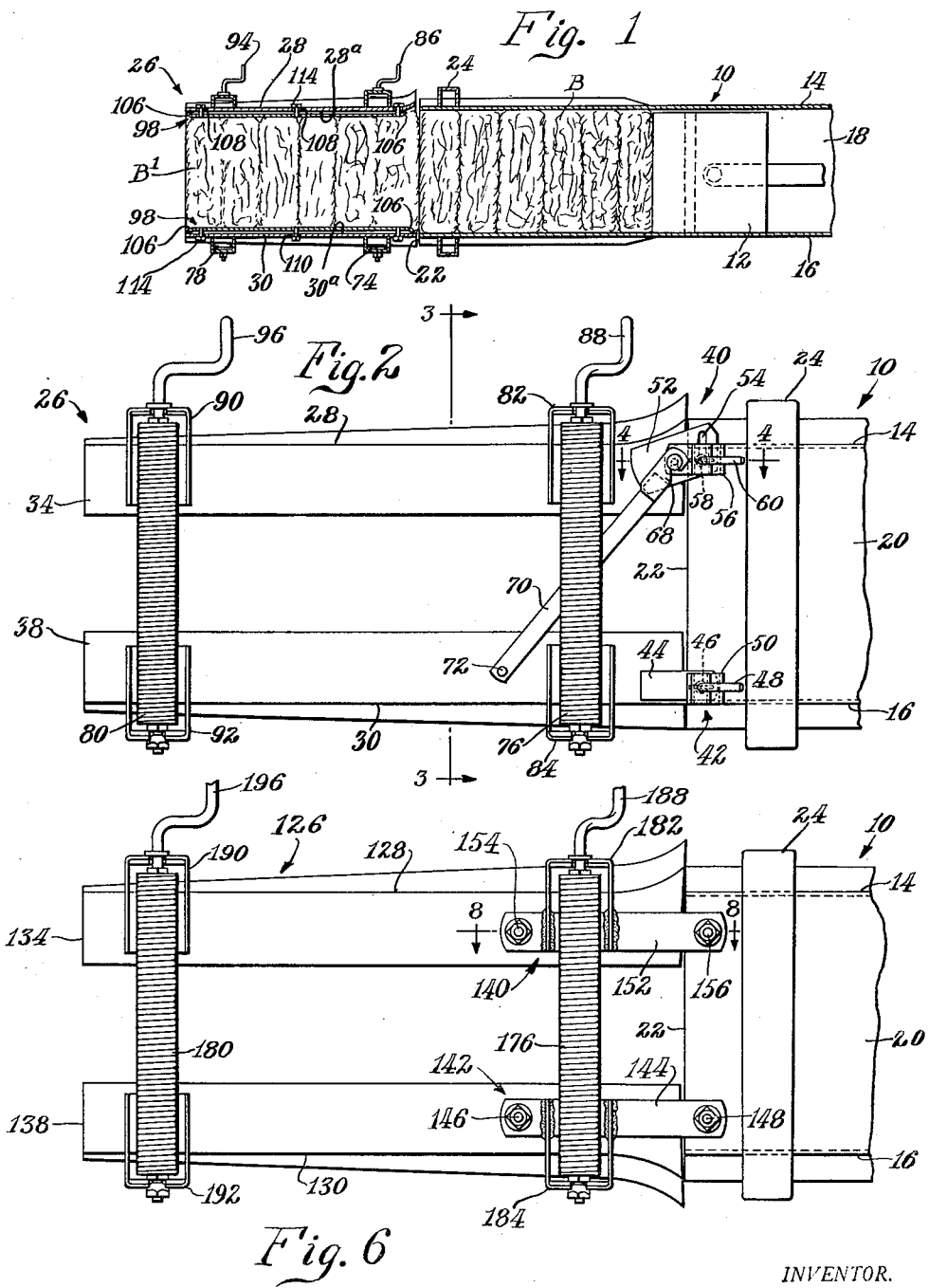
Figure 2 is a side elevational view on an enlarged scale of the bale case extension, showing its attachment to the outer or discharge end of a bale case.
Figure 6 is a side elevational view of a modified form of bale case extension.

Throughout the specification, reference will be had to the baler and bale case extension as having inner and outer ends and top and bottom walls, etc. These expressions are used in the interests of brevity and clarity and not to suggest that the structures could not be otherwise constructed according to equivalent means that will be obvious from the disclosure.

In the drawings, and particularly in Figure 1, the numeral 10 designates generally a bale case of typically conventional construction in which a bale B is being formed by a reciprocating plunger 12. The bale case 10 is generally rectangular in cross section, deriving this shape from upper and lower walls 14 and 16 and opposed upright side walls 18 and 20. In a conventional construction, the bale case extends with its length horizontal and the walls 14, 16, 18 and 20 have their terminal ends arranged to define an outer discharge opening 22. The bale case walls are relatively rigidly arranged and adjacent the discharge opening 22 are surrounded by collar structure 24. In short, these walls are relatively unflexible or unyielding and thus the shape of the bale case 10 may be considered permanent.

Control of the bales being formed in the bale chamber 10 is accomplished by the utilization of a bale case extension, here designated generally by the numeral 26. The bale case extension is in the form of an elongated box-like structure of generally rectangular shape substantially like that of the bale case 10 and is positionable in end-to-end relationship to the bale case so as to form a continuation thereof. The extension structure has an inner end proximate to and an outer end remote from the discharge end 22 of the bale case. As shown in Figure 1, the extension structure receives a preliminary bale B¹ which serves as a header in the operation of forming the bale B. Hence, the effect of the bale case extension on the bale B¹ will be reflected in the weight and density characteristics of the bale B.

The extension structure comprises a pair of complementary halves in the form of upper and lower plate-like members 28 and 30 respectively. These members are separated respectively above and below the longitudinal horizontal median plane of the extension structure 26. As best shown in Figures 2 and 3, the upper member 28 has opposite, downwardly extending side portions 32 and 34. The lower member is similarly formed with symmetrical portions 36 and 38. Hence, the portions 28, 32, 34 and 30, 36 and 38 define the rectangular shape of the extension structure. The vertical extent of the portions 32, 34, 36 and 38 may vary as desired. Similarly, the upper and lower members 28 and 30 could be repositioned so that they become side members. Normally however the upper and lower walls of the conventional bale case extension are the ones controlled.

Considered as an attachment for a typical or conventional baler, the bale case extension structure 26 has means at its inner end for the mounting thereof on the bale case in the position referred to above. This means takes the form of upper and lower supports designated generally by the numerals 40 and 42 respectively. Since it is not necessary that both members 28 and 30 be movable, but only that one member be movable relative to the other, the lower member 30 is here shown as attached to the bale case 10 by the support means 42 in such manner as to be maintained substantially in a fixed position.

There is a support 42 at each side of the lower member 30 and proximate portion of the bale case 10. Each of these supports comprises a bracket 44 rigidly fixed, as by welding for example, to the inner end of the lower member 30, preferably being secured to the proximate portion of the side portion 38. The bracket 44 is in the form of a strap having therein an aperture 46 adapted to receive a removable locking pin 48 which passes through an apertured bracket 50 rigidly secured to the bale case rear wall 20. A similar structure is, of course, provided at the other side of the baler.

The upper support 40 is duplicated at both sides of the baler and at each side comprises a bracket element 52 rigidly secured to the rear or inner end of the upper member 28, as by welding for example. This bracket element is sufficiently long so as to overlap a proximate portion of the bale case wall 20, being in that portion provided with vertical guide or slot means 54. A further part of the support comprises a second bracket element 56 apertured at 58 to receive a removable locking pin 60. The bracket 58 may be rigidly secured to an upper portion of the bale case wall 20. A similar bracket is, of course, carried on the opposite upright bale case wall 18. As best shown in Figure 4, the locking pin may be releasably retained in locking position by spring-loaded means 62, which means may take any desired form not important here.

The bracket 56 has a portion 64 that overlies a proximate portion of the bracket 52 on the upper member 28. This portion carries rigidly thereon a connecting pin 66 over which hooks the slotted upper end 68 of a downwardly and outwardly inclined brace 70. This brace 70 is connected at 72 at its lower or outer end to the upright portion 38 of the lower member 30. A similar brace will be provided at the opposite side of the structure.

Because of the combined pivotal and slotted mounting 60—54, the inner end of the upper member 28 is constrained for movement relative to the lower member 30 back and forth in a substantially vertical direction. The cooperation between the slot means 54 and the pivot element established by the locking pin 60 causes the member 28 to be constrained against longitudinal shifting either toward or away from the discharge end 22 of the bale case. At the same time, the free or outer end of the member may have vertical swinging about the pivot axis established by the pivot element or locking pin 60. For all practical purposes, the lower member 30 may be considered as fixed to the bale case 20. The locking pins 48 and 60 at the illustrated side of the structure, as well as those suggested at the other side of the structure, may be removed so that the extension 26 may be detached from the bale case 10.

Relative movement between the upper and lower members 28 and 30 is under control of a plurality of adjustable energy-storing means 74, 76, 78 and 80. Each means is in the form of a relatively strong tension spring having its axis or line of force upright or vertical. These springs are arranged in pairs, with the pair 74—76 adjacent the inner end of the extension structure 26 and the pair 78—80 at the outer end of the structure. The inner end portion of the upper member 28 is provided with a transverse element or yoke 82 parallel to a similar element or yoke 84 on the bottom member 30. As shown in Figure 3, the springs 74 and 76 are connected across the members 28 and 30 by means of the yokes 82 and 84. Tension on the springs 74 and 76 may be adjusted by cranks 86 and 88 respectively.

A similar arrangement is provided adjacent the outer end of the structure, whereat the upper member 28 has a transverse yoke 90 and a similar yoke 92 is provided across the underside of the bottom member 30. The springs 78 and 80 may be adjusted by cranks 94 and 96 respectively.

As the material compressed into a bale in the bale chamber 10 emerges into the extension 26, it is acted upon by the interior surfaces 28ª and 30ª of the upper and lower members 28 and 30 respectively. The frictional resistance between the bale material and these surfaces determines the density and weight of the bale being formed by the plunger 12. Tension on the springs 74, 76, 78 and 80 is preliminarily adjusted so that the upper and lower members 28 and 30 are biased toward each other. As the bale material enters the extension, it spreads the members 28 and 30 apart, the spreading being resisted, of course, by the tension or control springs. Because of the mounting of the upper member at 54—60, the inner end of the member may float vertically to an extent permitted by the energy stored in the springs 74 and 76. As the bale material continues outwardly in the extension structure, it is acted upon by the outer end portions of the members 28 and 30, which operate under control of the outer springs 78 and 80. In conditions in which the material being baled has a relatively high moisture content, tension on the springs may be released somewhat, which decreases the frictional resistance between the interior surfaces 28ª and 30ª and the bale material. Conversely, if the material has a relatively low moisture content, or is substantially dry, the tension may be materially increased, thus proportionately increasing the frictional resistance to passage of the material through the extension. This will result in the formation of a more compact bale in the bale case 10. The result sought to be achieved is uniformity in density and weight of the bales being formed, so that when the bales with the higher moisture content ultimately dry out, all bales will be theoretically of the same weight.

As a further feature of the invention, the compactness of the bales may be affected by the use of one or more bale-engaging elements in the form of skids designated generally by the numeral 98. One of these is shown by itself in Figure 5. These skids are removable and are illustrated as being secured in place in Figures 1 and 3. Each skid is of elongated, relatively narrow construction and in cross section has the shape of a U, with the bight of the U providing an elongated inner portion 100 and the legs of the U providing elongated side portions 102. The height of the side portions provides means for spacing a bale-engaging surface 104 on the portion 100 a predetermined distance inwardly of the interior surface 28ª or 30ª of the upper or lower members 28 or 30 respectively. The portion 100 may be continued at both ends of the skid beyond the side portions 102 and directed away from the surface 104 and toward the free ends of the portions 102 to provide ramps 106. These ramps facilitate the passage of the bale material from the bale case 10 to the bale case extension structure 26.

The upper member 28 may be provided centrally thereof with a plurality of apertures 108, and the lower member may be provided with similar apertures 110. The skid is provided with a plurality of threaded apertures 112 and securing means in the form of a plurality of cap screws 114 may be utilized to secure the skids removably in place.

In the modified form of the invention shown in Figures 6, 7 and 8, the principles outlined above are followed. To the extent that the two forms of the invention are substantially identical, the description will follow the same lines and the same reference characters, prefixed by the numeral "1," will be used in the description of the second form. For example, the bale case extension structure is designated by the numeral 126 and has upper and lower members 128 and 130 under control of a plurality of tension springs 174, 176, 178 and 180. The skid 98 may be used in the extension structure 126 in the same manner as it was used in the extension structure 26.

The extension structure 126 is mounted at the discharge end 22 of the bale case 10 by upper and lower support means 140 and 142. As in the case of the description of the extension structure 26, it will be understood that the support means 140 and 142 are repeated at both sides of the structure 126.

The upper support means comprises a link 152 having at one end a pivot element 154 and at its other end a pivot element 156. This link is substantially horizontally arranged and the pivot element 154 serves to connect that end of the link to the depending side portion 134 of the upper member 128. The other pivot element 156 serves as means for connecting the link 152 to the bale case 10.

The lower support 142 likewise comprises a link, designated by the numeral 144 and connected by pair of spaced apart pivot elements 146 and 148 respectively to the extension structure 126 and the bale case 10. The connection at 146 is effected at the upright side portion 138 of the lower member 130.

Because of the arrangement described above, the upper member 128 and lower member 130 have substantially the same movement relative to each other as the member 28 has relative to the member 30. That is to say, movement of the upper member 128, for example, is confined at its inner end to substantially straight-line vertical movement. At the same time, the outer end of the member may have vertical swinging about either of the pivot elements 154 or 156. Fundamentally, there is no lengthwise movement permitted for the upper member 128 toward the outer end of the structure 126, because of the length of the link 152. What has been said above applies also to the lower member 130.

The outer end of the upper member carries a transverse element in the form of a yoke 190 and a similar element 192 is provided across the bottom of the outer end portion of the lower member 130. The springs 178 and 180 are interconnected between the yokes 190 and 192 in the manner previously described in connection with the springs 78 and 80.

As to the connection of the springs 174 and 176 across the upper and lower members 128 and 130, there is a difference that is brought out particularly in Figures 6 and 8. Here, instead of a continuous transverse yoke 82, a pair of mounting members 182 is used, one secured to the link 152 and the other secured to the similar link at the other side of the structure 126. The same difference is repeated at the bottom member, wherein the transverse yoke 84 is replaced by a pair of mounting members 184 these being respectively secured to the lower connecting link 144. The springs 174, 176 thus act along parallel lines intermediate the pivot elements 154—156 and 146—148.

The upper and lower members 128 and 130 respectively have interior material-engaging surfaces 128ª and 130ª. Another difference between the structures 126 and 26 may be noted in Figure 7, wherein it is shown that the upper and lower members 128 and 130 have their inner end portions formed as ramps 128ᵇ and 130ᵇ, respectively, to facilitate the transfer of material from the bale case 10 to the extension structure 126. As stated above, the skids 98 may be used if desired and may be used in units of one or more.

In both forms of the invention, the characteristic is simplicity and controlled movement, particularly at the inner ends of the extension structures 26 and 126. Relative movement of the controlling members is such that the members cannot shift lengthwise, particularly toward the discharge end of the structure. Thus, the members are operative throughout their length to control the formation of the bale as dictated by the energy-storing means or springs.

Various specific features of the invention not enumerated herein will undoubtedly occur to those versed in the art, as likewise will numerous modifications and alterations in the preferred embodiments of the invention disclosed, all of which may be achieved without departing from the spirit and scope of the invention as defined in the appended claims.

What is claimed is:

1. For a baler having a bale case of generally rectangular section made up of horizontal upper and lower walls and upright side walls and provided with an outer discharge end: a bale case extension in the form of an elongated box-like structure having a cross-sectional shape substantially like that of the bale case and positionable in end-to-end relationship with and as a continuation of the bale case, having an inner end alined with and proximate to and an outer end remote from the discharge end of the bale case; said extension structure comprising separate, upper and lower plate-like members relatively movable vertically toward and away from each other and providing continuations respectively of the upper and lower bale case walls, each member having an interior surface engageable with bale material discharged between the members from the discharge end of the bale case; means for mounting the extension structure on the bale case, including upper and lower supports connected respectively to the upper and lower members and connectible to the bale case; one of said supports including means for confining movement of the inner end of its member to substantially vertical movement and for constraining said one member against movement lengthwise toward the outer end of the structure, said one support further including a transverse pivot for vertical swinging of the outer end of said one member; a first pair of upright springs, one at each side of the inner end of the structure, connected between the inner ends of the upper and lower members for urging the said inner ends toward each other; and a second pair of upright springs, one at each side of the outer end of the structure, connected between the outer ends of the upper and lower members for urging said outer ends together.

2. The invention defined in claim 1, further characterized in that: said one support comprises a pair of elongated links respectively at opposite sides of the inner end of the extension structure and extending lengthwise thereof; the aforesaid pivot comprises a pair of transversely coaxial pivot pin elements respectively pivoting the outer ends of the link elements to opposite sides of said one member intermediate the inner and outer ends of said one member; and second pivot means paralleling the axis of the pivot elements for connecting the inner ends of the links to the bale case.

3. The invention defined in claim 2, further characterized in that: the line of force exerted by each of the springs in the first pair of springs passes intermediate the inner and outer ends of the respective link.

4. The invention defined in claim 3, further characterized in that: each of the springs in the first pair is connected at one end directly to the respective link and at its other end to the other of said members.

5. The invention defined in claim 1, further characterized in that: said one support comprises a pair of bracket elements, one at each side of the inner end of said one member and each having an upright slot means therein; said pivot comprises a pair of transversely coaxial pivot pin elements, one at each side of the inner end of said one member and respectively riding in said slot means; and one element at each side of the extension structure being fixable to the bale case and the cooperative element being fixed to the inner end of said one member.

6. For a baler having a bale case of generally rectangular section made up of horizontal upper and lower walls and upright side walls and provided with an outer discharge end: a bale case extension in the form of an elongated box-like structure having a cross-sectional shape substantially like that of the bale case and positionable in end-to-end relationship with and as a continuation of the bale case, having an inner end alined with and proximate to and an outer end remote from the discharge end of the bale case; said extension structure comprising separate, upper and lower plate-like members relatively movable vertically toward and away from each other and providing continuations respectively of the upper and lower bale case walls, each member having an interior surface engageable with bale material discharged between the members from the discharge end of the bale case; means for mounting the extension structure on the bale case, including upper and lower supports connected respectively to the upper and lower members and connectible to the bale case; one of said supports including means for confining movement of the inner end of its member to substantially vertical movement and for constraining said one member against movement lengthwise toward the outer end of the structure, said one support further including a transverse pivot for vertical swinging of the outer end of said one member; first energy-storing means interconnecting the inner ends of the upper and lower members for biasing said inner ends vertically toward each other; and second energy-storing means interconnecting the outer ends of the upper and lower members for biasing said outer ends toward each other.

7. For a baler having a bale case of generally rectangular section made up of horizontal upper and lower walls and upright side walls and provided with an outer discharge end: a bale case extension in the form of an elongated box-like structure having a cross-sectional shape substantially like that of the bale case and positionable in end-to-end relationship with and as a continuation of the bale case, having an inner end alined with and proximate to and an outer end remote from the discharge end of the bale case; said extension structure comprising separate, upper and lower plate-like members providing continuations respectively of the upper and lower bale case walls, each member having an interior surface engageable with bale material discharged between the members from the discharge end of the bale case; means for mounting the extension structure on the bale case; an elongated interior skid element positionable lengthwise of one of said members and centrally thereof along its inner surface, said element having such thickness as to present a secondary interior surface spaced vertically inwardly from the interior surface of said one member; and means cooperative between the element and said one member for removably securing the element in place.

8. For a baler having a plurality of walls arranged in generally rectangular form to define an elongated chamber through which bale material is forced: a material-engaging skid element of elongated, relatively narrow construction positionable to extend lengthwise of the bale chamber along the interior of one of the walls of the chamber to form a reduction in the volume of the chamber; and means associated with the element for effecting the fixed but removable mounting thereof in the bale chamber.

9. The invention defined in claim 8, in which: the element is in the form of a U in cross-section, the bight of the U providing a material-engaging surface; and the legs of the U engaging and providing side portions for spacing said surface from the interior of a bale case wall.

10. The invention defined in claim 9, in which: that portion of the element defined by the bight of the U is extended lengthwise beyond the side portions of the element and is directed away from the material-engaging surface and toward the free edges of the side portions to provide a ramp.

ARNOLD B. SKROMME.

No references cited.